Sept. 15, 1942.  C. H. LAWS  2,295,669
EXHAUSTER
Filed Oct. 22, 1940
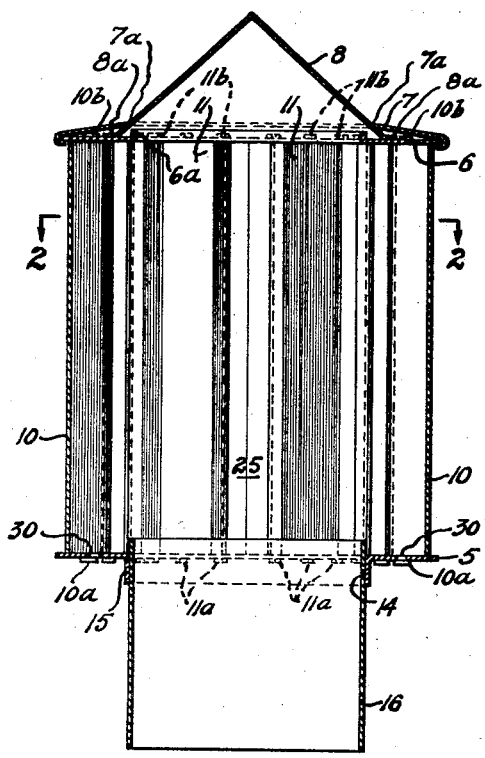
Fig. 1.
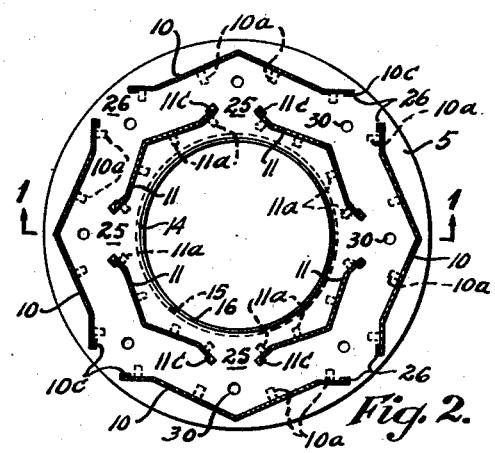
Fig. 2.
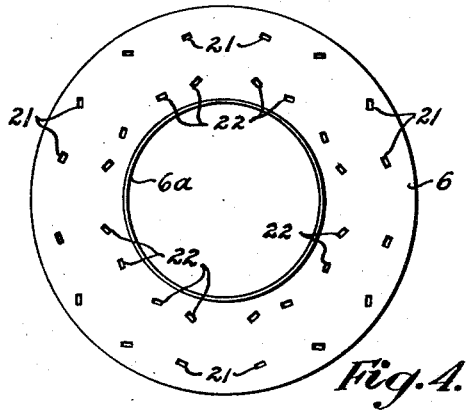
Fig. 4.
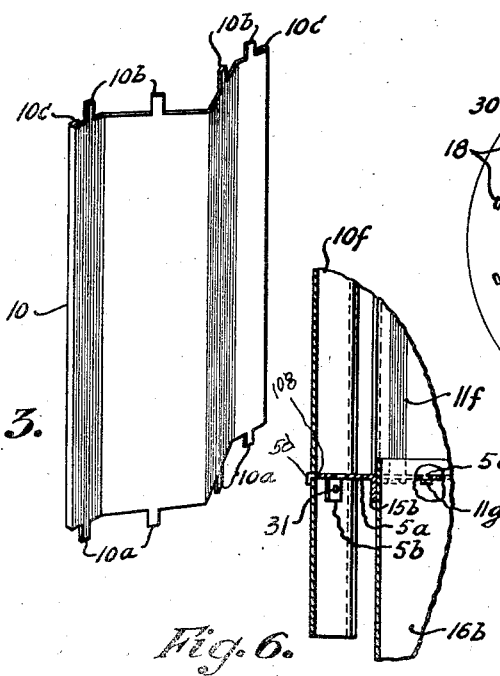
Fig. 3.
Fig. 6.
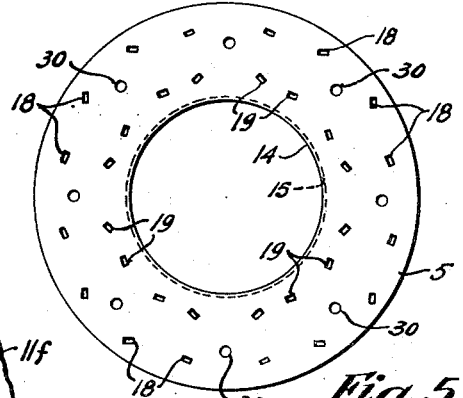
Fig. 5.
Inventor:
Charles H. Laws.
Attorney.

Patented Sept. 15, 1942

2,295,669

UNITED STATES PATENT OFFICE 2,295,669

EXHAUSTER

Charles H. Laws, Los Angeles, Calif.

Application October 22, 1940, Serial No. 362,239

5 Claims. (Cl. 98—66)

My invention has to do with air exhausters and, more particularly, relates to exhausters used for ventilation purposes, although I wish it understood that my invention is susceptible of other advantageous uses. For instance, I have found that it is extremely useful in exhausting smoke from chimneys.

While exhausters somewhat of this general type are known in the art, all those with which I am familiar have possessed certain rather fatal shortcomings due to the inherent nature of their construction. For instance, they have been of a construction which required welding or soldering together of parts and since they most usually are made of galvanized metal to withstand exposure to the weather, the heat incident to soldering or welding seriously injures the galvanized coating. Also, where the parts are assembled in the manners heretofore practiced in this art, it has been found impracticable to make and ship the devices in knocked-down form due to the fact that it requires particular skill and special equipment to assemble the parts, which would render them impracticable for assembly on the job. Another objection to prior art devices, particularly with the larger size exhausters, is that, due to their having to be assembled where special equipment for the purpose is available, they are often so heavy and cumbersome that it is extremely difficult to get them onto a roof for mounting. Furthermore, prior devices have been of a construction which rendered them relatively costly to manufacture and less durable than devices made in accordance with my invention. For instance, it frequently happens that their solder or weld breaks loose and causes the device to lose its effectiveness.

Therefore, my improvements have to do principally with novel construction and assembly features having for their principal objects the provision of a device of this character which may be manufactured and shipped in knocked-down form and readily assembled on the job without requiring skilled labor or special equipment; which provides a substantial and durable construction and which may be manufactured and handled at minimum cost.

How these and other objects and accomplishments of my invention are attained will become clear from the following detailed description of one preferred form which my invention may take, for the purposes of which description I shall make reference to the accompanying drawing, in which:

Fig. 1 is a longitudinal section through the device taken on line 1—1 of Fig. 2;

Fig. 2 is a cross section on line 2—2 of Fig. 1;

Fig. 3 is a perspective of a typical outer deflecting panel;

Fig. 4 is a plan view of the top plate;

Fig. 5 is a plan view of the bottom plate; and

Fig. 6 is a fragmentary section of a variational form.

Referring now to the drawing, my exhauster is shown as a somewhat round, box-like structure having a bottom plate 5, a top plate 6, a crown plate 7, a conical crown 8, an outer wall comprised of annularly spaced deflector panels 10 and an inner wall spaced from the outer wall and comprised of annularly spaced deflector panels 11. In Fig. 3, I show a perspective of a typical outer panel 10, but it will be understood that the inner panels 11 are of the same form and construction except that they are relatively narrower in proportion to the outer panels.

The bottom plate 5 has a central opening 14 around which there is provided an annular depending flange 15 to receive a connecting tube 16, the tube being secured within the flanged portion by riveting or any other suitable means. Two radially spaced parallel rows of slots 18, 19 are cut through plate 5 and two similar rows of slots 21, 22 are cut through the top plate, for the purposes to be hereinafter described.

Each of the metal blanks for the deflector panels 10, 11 is first cut out of the whole metal and next the ends are cut to provide the spaced ears 10a, 10b, 11a, 11b, here shown as being four in number on each end of each panel, although of course any desired number of the ears may be employed. The blanks are then stamped or otherwise formed into the finished panels, which have a somewhat winged-V-shaped in cross-section, after which the panels are mounted between the end plates by the ears 10a, 10b of the outer panels being extended through slots 18, 21, respectively, and ears 11a, 11b of the inner panels being extended through slots 19, 22, respectively, of the end plates. Those ears are then bent down against the respective top and bottom plates to secure them against escape from the slots and thus secure the parts together. These slots and ears enable uniform spacing and positioning of the panels at all times without requiring any time or trouble while assembling the device on the job. The metal along the side edges of the outer panels 10 are inwardly and backwardly bent as shown at 10c to provide a strengthening rib along said edges. Also, the side edges of the inner panels 11 are outwardly and backwardly bent as shown at 11c, not only for strengthening purposes, but also to provide rain-strippers—that is, the backwardly bent portion acts to catch water particles carried in the air passing thereover.

As will be best shown in Fig. 2, when thus assembled the inner panels 11 are circumferentially spaced apart to provide exhaust openings 25 therebetween and the outer panels are circumferentially spaced apart to provide outer openings 26 therebetween. The panels are assembled in staggered relation so that each opening 26 will be circumferentially offset from each adjacent opening 25, and vice versa. Thus, as an air current enters any of the openings 26, it will be deflected so as to pass over one or more of the exhaust openings 25 before it passes out the next opening 26 in its path, thus exerting a siphoning effect on the exhaust opening 25, tending to exhaust air from the room or other structure with which the device is in communication. Also as an air current passes over an outer opening 26 it is deflected outwardly and induces a sub-atmospheric pressure on the adjacent inner openings 25 to siphon air outwardly therethrough. The cross-sectional shape of the respective panels provides air passageways of substantially uniform width.

When the device is thus assembled, I then place the conical crown member 8 atop plate 6 over central opening 6a, and the crown plate 7 is then mounted on plate 6 by crimping its peripheral edge over the peripheral edge of plate 6. Crown 8 has a base portion 8a which is confined between plate 6 and crown plate 7, the crown 8 projecting up through central opening 7a in the crown plate 7, all as best shown in Fig. 1. Cone-shaped crown 8 not only serves to shed any water that might tend to collect on the top of the crown plate, but it also tends to deflect outwardly any down current that may encounter the crown, thus causing those currents to induce a lowered pressure on openings 26 and 25 to exhaust air from the room or the like.

In mounting the device on a building or the like, the tubular portion 16 is inserted over a conventional opening or ventilating stack. Preferably the portion 16 extends into the device to a point where its top end is above the plane of the bottom plate 5 so as to prevent any water which might accidentally enter the device from the exterior from dropping into the room or other space being ventilated. Also, in this connection, I provide a plurality of openings 30 through the bottom plate to permit escape of any water which might otherwise be trapped in the device.

From the foregoing description, it will be observed that the various elements of my device may be manufactured and shipped to the place of use in completely knocked-down condition because the assembly is simply a matter of inserting the ears provided on the deflector panels into the corresponding slots in the cover plates and bending them down against the respective cover plates. The crown and crown plate are then applied in the manner described, which requires only a simple crimping tool to crimp the peripheral edge of crown plate 8 sufficiently to anchor it to the top plate. Such assembly does not require any skilled labor nor does it require the use of any special tools or machinery.

In Fig. 6, I show a variational form of device which is like that of Figs. 1 to 5, inclusive, except that the bottom plate 5a has downwardly depending flanges 5b, and the outer panels 10f extend at their bottom ends below plate 5a and are detachably secured to flanges 5b by means of bolts or rivets 31. As a further or alternative means of attaching outer panels 10f to lower plate 5a, I provide spaced ears 5d on the outer edge of the plate 5a, which ears pass through suitably placed holes 10g in the panel 10f, the ears being bent downwardly after being inserted in the holes.

The inner panels 11f are secured at their bottom ends to plate 5a by ears 11g in slots 5c as before described in connection with the other figures. Connecting tube 16b is mounted in attaching flange 15b as before described. The top portion of the device is constructed and assembled as before described.

While I have resorted to considerable detail for the purpose of making my invention understood, I wish it understood that within the broader scope of my invention, as defined by the appended claims, various modifications and adaptations may be made without departing from the spirit of the invention.

I claim:

1. An exhausting device of the class described comprising top and bottom cover plates each having radially spaced rows of slots therethrough, radially spaced rows of air deflecting panels, ears formed on the respective ends of the panels for detachably engaging said slots, the panels of each row being circumferentially spaced apart whereby to provide air passing openings between adjacent panels, and a central air-admitting opening through the bottom cover plate.

2. An exhausting device of the class described comprising top and bottom cover plates, radially spaced rows of air deflecting panels, the panels of each row being circumferentially spaced apart whereby to provide air passing openings between adjacent panels, the panels of one row being staggered with relation to the panels of the adjacent row whereby to cause the air passing openings of each row to be circumferentially offset from the air passing openings of the adjacent row, means for mounting the panels between the cover plates including spaced slots in the cover plates and spaced ears on the panels cooperating with said slots, and a central opening through the bottom cover plate through which air to be exhausted may enter.

3. An exhausting device of the class described comprising top and bottom cover plates, air deflecting panels mounted between said plates, a crown plate secured along its peripheral edge to the top cover plate, a central opening in the crown plate, and a cone-shaped member having a base portion confined between the top cover plate and the crown plate.

4. The device of claim 1 in which the side edge portions of the inner air deflecting panels are each backwardly and outwardly bent to provide water stripping means.

5. An exhausting device of the class described comprising parallel upper and lower cover plates and two radially spaced rows of air deflecting panels mounted therebetween, two radially spaced rows of slots in the upper cover plate, spaced ears on the top end of the respective panels, said ears fitting into said slots, circumferentially spaced slots in the lower cover plate, spaced ears on the bottom end of the respective panels of the innermost row, said ears fitting into the respective slots in the lower cover plate, and means for securing the lower portion of the outer row of panels to the peripheral portion of the lower cover plate.

CHARLES H. LAWS.